(12) United States Patent
Heinemann et al.

(10) Patent No.: US 12,728,625 B2
(45) Date of Patent: Sep. 8, 2026

(54) CRAZING RESISTANT CAN END STOCK

(71) Applicant: NOVELIS INC., Atlanta, GA (US)

(72) Inventors: Michael Heinemann, Vellmar (DE); Jan-Tobias Pape, Bodensee (DE); Christian Tussing, Koblenz (DE); Dhiren Bhupatial Ruparelia, Göttingen (DE); Cornelia Schroeder, Göttingen (DE); Ian Musson Campbell, Goettingen (DE); Richard Palatz, Gerbershausen (DE)

(73) Assignee: Novelis Inc., Atlanta, GA (US)

( * ) Notice: Subject to any disclaimer, the term of this patent is extended or adjusted under 35 U.S.C. 154(b) by 280 days.

(21) Appl. No.: 18/556,169

(22) PCT Filed: Apr. 13, 2022

(86) PCT No.: PCT/US2022/071694
§ 371 (c)(1),
(2) Date: Oct. 19, 2023

(87) PCT Pub. No.: WO2022/226469
PCT Pub. Date: Oct. 27, 2022

(65) Prior Publication Data

US 2024/0190108 A1 Jun. 13, 2024

Related U.S. Application Data

(60) Provisional application No. 63/178,313, filed on Apr. 22, 2021.

(51) Int. Cl.
*B32B 15/09* (2006.01)
*B32B 15/20* (2006.01)
*B32B 38/00* (2006.01)

(52) U.S. Cl.
CPC .............. *B32B 15/09* (2013.01); *B32B 15/20* (2013.01); *B32B 38/0036* (2013.01); *B32B 2038/0048* (2013.01)

(58) Field of Classification Search
None
See application file for complete search history.

(56) References Cited

U.S. PATENT DOCUMENTS 4,828,136 A 5/1989 Kawahara et al.
5,059,460 A * 10/1991 Heyes .................. B32B 37/085 428/458

(Continued)

FOREIGN PATENT DOCUMENTS

CN 1338989 A 3/2002
CN 107531019 A 1/2018

(Continued)

OTHER PUBLICATIONS

Masuda—JP 2004-090968 A—CN B D1—MT—laminated can lid—2004 (Year: 2004).*

(Continued)

*Primary Examiner* — John Vincent Lawler
(74) *Attorney, Agent, or Firm* — Kilpatrick Townsend & Stockton LLP

(57) ABSTRACT

Provided herein are an aluminum can end stock (CES) and methods for producing CES. The CES includes a laminated metal strip having a polymer film coating and beneficially exhibiting crazing resistance. In some cases, the crazing-resistant CES described herein also exhibit low feathering and high abrasion resistance. The laminated metal strip can include the laminated polymer coating on an interior-facing side of the metal strip. The laminated metal strip can further include a pretreatment coating between the polymer film coating and the metal strip. The CES is formed by laminating a polymer film to a side of the metal strip and annealing (Continued)

the laminated metal strip. In some cases, the polymer film laminated to the metal strip is a polyethylene terephthalate (PET) film.

17 Claims, 5 Drawing Sheets

(56) References Cited

U.S. PATENT DOCUMENTS

| | | | | | |
|---|---|---|---|---|---|
| 5,103,550 | A * | 4/1992 | Wefers | C23C 22/66<br>413/18 |
| 5,582,319 | A * | 12/1996 | Heyes | B32B 27/32<br>428/35.8 |
| 10,836,150 | B2 | 11/2020 | Tussing et al. | |
| 2017/0326862 | A1* | 11/2017 | Spahn | B65D 17/4012 |
| 2019/0291924 | A1 | 9/2019 | Neel et al. | |
| 2019/0351652 | A1* | 11/2019 | Fujii | B32B 27/20 |
| 2020/0207063 | A1 | 7/2020 | Spahn et al. | |

FOREIGN PATENT DOCUMENTS

| | | | | |
|---|---|---|---|---|
| CN | 108883606 | A | 11/2018 | |
| EP | 1165317 | B1 * | 8/2004 | B32B 27/36 |
| JP | S6312445 | A | 1/1988 | |
| JP | 2002337868 | A | 11/2002 | |
| JP | 2004090968 | A * | 3/2004 | B65D 8/00 |
| JP | 2019517937 | A | 6/2019 | |
| JP | 2019520245 | A | 7/2019 | |
| JP | 2019524501 | A | 9/2019 | |
| JP | 2022515886 | A | 2/2022 | |
| KR | 940000196 | B1 | 1/1994 | |

OTHER PUBLICATIONS

Japanese Patent Application No. 2023-564640, "Office Action", Sep. 16, 2025, 8 pages.

CA Application No. 3,219,758, "Office Action", Oct. 15, 2024, 4 pages.

EP Application No. 22724604.8, "Intention to Grant", Sep. 30, 2024, 9 pages.

JP Application No. 2023-564640, "Office Action", Sep. 3, 2024, 9 pages.

International Application No. PCT/US2022/071694 , "International Search Report and Written Opinion", mailed on Aug. 24, 2022, 18 pages.

International Application No. PCT/US2022/071694 , "Invitation to Pay Additional Fees and, Where Applicable, Protest Fee", Jun. 29, 2022, mailed on 10 pages.

European Patent Application No. 25152784.2, "Extended European Search Report", Apr. 11, 2025, 9 pages.

Japanese Patent Application No. 2023-564640, "Office Action", Apr. 8, 2025, 8 pages.

International Application No. PCT/US2022/071694 , "International Preliminary Report on Patentability", Nov. 2, 2023, 11 pages.

Korean Patent Application No. 10-2023-7035818, "Office Action", May 27, 2025, 6 pages.

Chinese Patent Application No. 202280029882.7, "Office Action", Jun. 17, 2025, 16 pages.

Canadian Patent Application No. 3,219,758, "Office Action", Jun. 19, 2025, 4 pages.

Japanese Patent Application No. 2023-564640, "Office Action", Feb. 10, 2026, 7 pages.

Chinese Patent Application No. 202280029882.7 , "Office Action", Jan. 14, 2026, 13 pages.

European Patent Application No. 25152784.2 , "Office Action", Dec. 17, 2025, 4 pages.

Korean Patent Application No. 10-2023-7035818 , "Notice of Decision to Grant", Dec. 17, 2025, 7 pages.

Brazilian Patent Application No. BR112023021889-6, "Office Action", May 11, 2026, 7 pages.

* cited by examiner

CRAZING RESISTANT CAN END STOCK

CROSS-REFERENCE TO RELATED APPLICATION

This application is a U.S. national phase under 35 U.S.C. § 371 of International Patent Application No. PCT/US2022/071694, filed Apr. 13, 2022, which claims the benefit of and priority to U.S. Provisional Application No. 63/178,313, filed on Apr. 22, 2021, which are hereby incorporated by reference in their entirety for all purposes.

FIELD

The present disclosure relates generally to metalworking and, more specifically, to laminated metal strips suitable for use as can end stock and to their production.

BACKGROUND

Certain metal products, such as aluminum beverage cans, may require or otherwise benefit from a protective layer between the metal and its contents. For example, beverage cans often must provide sufficient protection between the metal of the beverage can and the beverage contained therein to avoid damage to the metal from harsh beverages, such as sodas and colas, as well as to avoid undesirable effects to the beverage, such as discoloration or change in taste.

There are often requirements placed on the protective layers on the interior surfaces of metal products. For example, the protective layer must adequately adhere to the metal product. Conventional protective layers have been found to demonstrate undesirable susceptibility to damage, such as by crazing and/or feathering. Thus, conventional protective layers are ineffective.

SUMMARY

In some aspects, the present disclosure provides a process for preparing a crazing-resistant can end stock, comprising: applying a pretreatment coating to a first side of a metal strip; laminating a polymer film to the first side of the metal strip to form a laminated metal strip, wherein the polymer film is adhered to at least a portion of the pretreatment coating; and annealing the laminated metal strip at an annealing temperature, wherein the annealing temperature is less than 250° C. In some cases, the can end stock exhibits no visible crazing. In some cases, the first side of the metal strip corresponds to an interior-facing side of a can end formed from the metal strip. In some cases, the metal strip is an aluminum strip. In some cases, the polymer film comprises a polyethylene terephthalate film. In some cases, the pretreatment coating comprises a polymer or co-polymer. In some cases, the annealing temperatures is less than 230° C. In some cases, the annealing temperature is greater than 150° C.

In some aspects, the present disclosure provides a can end stock product prepared according to any of the process described herein. In some cases, the first side of the metal strip corresponds to an exterior-facing side of the can end stock product. In some cases, the polymer film has a thickness less than 50 μm.

In some aspects, the present disclosure provide a beverage can comprising a body piece and an end cap, wherein the end cap is formed from can end stock prepared according to any of the process described herein.

In some aspects, the present disclosure provides a can end stock, comprising: a metal strip; a pretreatment composition; and a polymer film, wherein the can end stock exhibits no visible crazing. In some cases, the can end stock exhibits no visible crazing within 24 hours after a strain test, wherein the strain test comprises application of a 2% strain with a 10 $N/mm^2 \cdot s$ force. In some cases, the can end stock exhibits no visible crazing under UV light within 24 hours after the strain test, wherein the strain test further comprises coating the samples with a fluorescent marker. In some cases, the metal strip is an aluminum strip. In some cases, the polymer film comprises a polyethylene terephthalate. In some cases, the pretreatment composition is a polymer or co-polymer. In some cases, the polymer film exhibits an FTIR absorbance peak intensity ratio (A/B) greater than 0.4, wherein A indicates a first absorbance peak at a wavenumber from 1330 cm 1 to 1350 cm 1 and B indicates a second absorbance peak at a wavenumber from 1400 cm 1 to 1420 cm-1. In some cases, the absorbance peak intensity ratio (A/B) is greater than 1.0.

In some aspects, the present disclosure provides a system, comprising: a lamination system for accepting a metal strip and applying a polymer film to a first side of the metal strip; and an annealing furnace positioned downstream of the lamination system for accepting a laminated metal strip and heating the laminated metal strip at an annealing temperature, wherein the annealing temperature is less than 250° C. In some cases, the metal strip is an aluminum strip. In some cases, the system further comprises a pretreatment coating application system for applying a pretreatment coating to the metal strip, wherein the lamination system is configured to apply the polymer film to the pretreatment coating. In some cases, the lamination system is coupled to a supply of polyethylene terephthalate film. In some cases, the annealing temperature is less than 230° C. In some cases, the annealing temperature is greater than 150° C.

In some aspects, the present disclosure provides a method for assessing the susceptibility of a can end stock to crazing, the method comprising: stamping a can end stock to produce a test sample; applying a strain to the test sample to produce a stressed sample; and observing the stressed sample for crazing. In some cases, applying a strain comprises applying a 2% strain with a 10 $N/mm^2 \cdot s$ force. In some cases, observing the stressed sample comprises shining a light on the stressed sample. In some cases, the method further comprises coating the test sample and/or the stressed sample with a fluorescent marker, and wherein observing the stressed sample comprises shining a UV light on the stressed sample.

BRIEF DESCRIPTION OF THE DRAWINGS

The disclosure is described in detail below with reference to the appended drawings, wherein like numerals designate similar parts.

FIG. 3A is a sheet of can end stock according to certain aspects of the present disclosure.

FIG. 3B depicts the sheet of can end stock of FIG. 3A after being cut according to certain aspects of the present disclosure.

FIG. 3C depicts a set of can end blanks produced from the sheet of can end stock of FIG. 3A according to certain aspects of the present disclosure.

FIG. 3D depicts a beverage can including a can end formed from a can end blank from FIG. 3C according to certain aspects of the present disclosure.

DETAILED DESCRIPTION

Figures 1, 2:
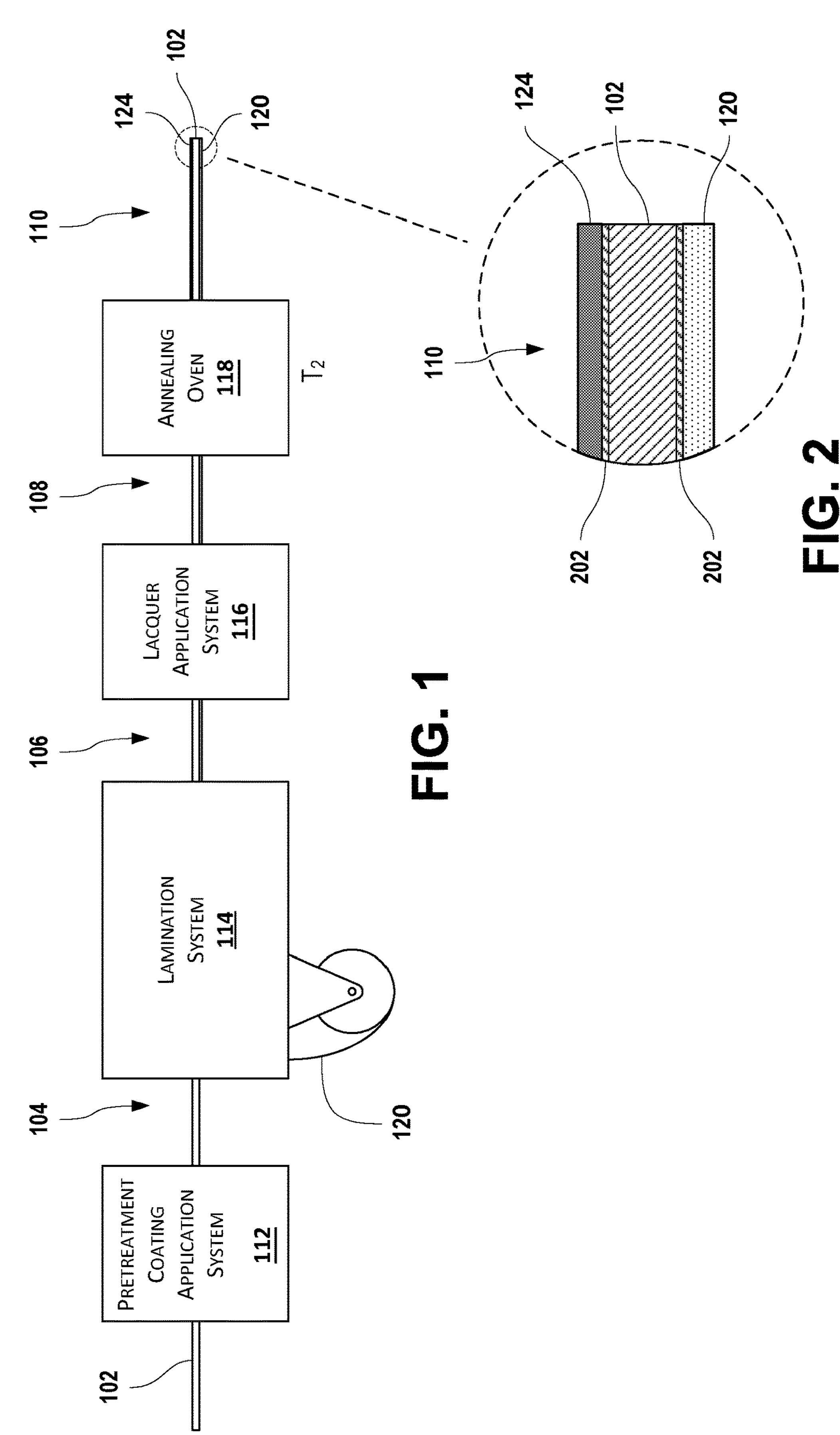
FIG. 1 is a schematic diagram of a system for preparing can end stock according to certain aspects of the present disclosure.
FIG. 2 is a close-up side view of the can end stock of FIG. 1.

Described herein are processes and systems for producing can end stock from a metal strip, such as an aluminum strip. In the processes described herein, a polymer film, such as a polyethylene terephthalate film, is laminated to an interior side of the metal strip. The resultant can end stock can be used, for example, in beverage cans.

The can end stock produced according the methods described herein advantageously exhibit improved properties. In particular, the can end stock exhibits resistance to crazing (as defined below). In some cases, the can end stock described herein also exhibits low feathering. The methods described herein also provide a more efficient means of applying protective film(s) to a metal strip.

As explained further in the present disclosure, it has been found that conventional polymer films (such as polyethylene terephthalate) may be highly susceptible to crazing. Conventional polymer films are particularly prone to crazing during a seaming process, whereby can end stock and can body stock are joined. It has been found that seaming processes initiate, encourage, or otherwise exacerbate crazing of the polymer films.

Furthermore, it has been found that process conditions impact the susceptibility of polymer films to crazing. In particular, annealing laminated metal strips at lower temperatures beneficially reduces the susceptibility of the produced can end stock to crazing. Whereas conventional processes encourage high annealing temperatures to produce a polymer film with higher adhesion and resistance to feathering, the novel processes described herein anneal at relatively lower temperatures and produce a can end stock with good adhesion as well as resistance to crazing. Said another way, the present disclosure provides processes for producing crazing-resistant can end stock.

Definitions and Descriptions

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below.

In this description, reference is made to alloys identified by aluminum industry designations, such as "series" or "7xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

Aluminum alloys are described herein in terms of their elemental composition in weight percentage (wt. %) based on the total weight of the alloy. In certain examples of each alloy, the remainder is aluminum, with a maximum wt. % of 0.15% for the sum of the impurities.

As used herein, "crazing" refers to the formation and/or propagation of small cracks on or close to the surface of and/or on the opposite face of a protective layer (e.g., polymer film) on the metal strip, especially during a process for seaming, e.g., of a can end stock to a can body stock. In some cases, the cracks extend through the protective layer (e.g., polymer film). i.e., from the surface of the protect layer to the surface facing the metal strip.

As used herein, "feathering" refers to the elongation and delamination of in a protective layer (e.g., polymer film) on the metal strip, especially at breaks in the metal, such as the orifice created when opening a beverage can.

Reference is made in this application to alloy condition or temper. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. A T1 condition or temper refers to an aluminum alloy cooled from hot working and naturally aged (e.g., at room temperature). A T2 condition or temper refers to an aluminum alloy cooled from hot working, cold worked, and naturally aged. A T3 condition or temper refers to an aluminum alloy solution heat treated, cold worked, and naturally aged. A T4 condition or temper refers to an aluminum alloy solution heat treated and naturally aged. A T5 condition or temper refers to an aluminum alloy cooled from hot working and artificially aged (at elevated temperatures). A T6 condition or temper refers to an aluminum alloy solution heat treated and artificially aged. A T7 condition or temper refers to an aluminum alloy solution heat treated and artificially overaged. A T8x condition or temper refers to an aluminum alloy solution heat treated, cold worked, and artificially aged. A T9 condition or temper refers to an aluminum alloy solution heat treated, artificially aged, and cold worked.

As used herein, the meaning of "a," "an," or "the" includes singular and plural references unless the context clearly dictates otherwise.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Metal Strip

The present disclosure provides processes and systems for producing can end stock from a metal strip. More specifically, the methods described herein include applying a pretreatment coating to a first side of a metal strip and laminating a polymer film to the first side of the metal strip. The composition of the metal strip on which the polymer film is laminated is not limited. The methods described herein are particularly well suited for, but not limited to, aluminum strips. The polymer film may be applied, for example, to any suitable aluminum alloy, such as a continuous coil of an aluminum alloy. Suitable aluminum alloys include, for example, 1xxx series aluminum alloys, 2xxx series aluminum alloys, 3xxx series aluminum alloys, 4xxx series aluminum alloys, 5xxx series aluminum alloys, 6xxx series aluminum alloys, 7xxx series aluminum alloys, and 8xxx series aluminum alloys.

By way of non-limiting example, exemplary 1xxx series aluminum alloys for use as the metal strip can include AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, or AA1199. In some cases, the aluminum alloy is at least 99.9% pure aluminum (e.g., at least 99.91%, at least 99.92%, at least 99.93%, at least 99.94%, at least 99.95%, at least 99.96%, at least 99.97%, at least 99.98%, or at least 99.99% pure aluminum).

Non-limiting exemplary 2xxx series aluminum alloys for use as the metal strip can include AA2001, AA2002, AA2004, AA2005, AA2006, AA2007, AA2007A, AA2007B, AA2008, AA2009, AA2010, AA2011, AA2011A, AA2111, AA2111A, AA2111B, AA2012, AA2013, AA2014, AA2014A, AA2214, AA2015, AA2016, AA2017, AA2017A, AA2117, AA2018, AA2218, AA2618, AA2618A, AA2219, AA2319, AA2419, AA2519, AA2021, AA2022, AA2023, AA2024, AA2024A, AA2124, AA2224, AA2224A, AA2324, AA2424, AA2524, AA2624, AA2724, AA2824, AA2025, AA2026, AA2027, AA2028, AA2028A, AA2028B, AA2028C, AA2029, AA2030, AA2031, AA2032, AA2034, AA2036, AA2037, AA2038, AA2039, AA2139, AA2040, AA2041, AA2044, AA2045, AA2050, AA2055, AA2056, AA2060, AA2065, AA2070, AA2076, AA2090, AA2091, AA2094, AA2095, AA2195, AA2295, AA2196, AA2296, AA2097, AA2197, AA2297, AA2397, AA2098, AA2198, AA2099, or AA2199.

Non-limiting exemplary 3xxx series aluminum alloys for use as the metal strip can include AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, or AA3065.

Non-limiting exemplary 4xxx series aluminum alloys for use as the metal strip can include AA4004, AA4104, AA4006, AA4007, AA4008, AA4009, AA4010, AA4013, AA4014, AA4015, AA4015A, AA4115, AA4016, AA4017, AA4018, AA4019, AA4020, AA4021, AA4026, AA4032, AA4043, AA4043A, AA4143, AA4343, AA4643, AA4943, AA4044, AA4045, AA4145, AA4145A, AA4046, AA4047, AA4047A, or AA4147.

Non-limiting exemplary 5xxx series aluminum alloys for use as the metal strip can include AA5182, AA5183, AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, or AA5088.

Non-limiting exemplary 6xxx series aluminum alloys for use as the metal strip can include AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, or AA6092.

Non-limiting exemplary 7xxx series aluminum alloys for use as the metal strip can include AA7011, AA7019, AA7020, AA7021, AA7039, AA7072, AA7075, AA7085, AA7108, AA7108A, AA7015, AA7017, AA7018, AA7019A, AA7024, AA7025, AA7028, AA7030, AA7031, AA7033, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7033, AA7034, AA7036, AA7136, AA7037, AA7040, AA7140, AA7041, AA7049, AA7049A, AA7149, AA7204, AA7249, AA7349, AA7449, AA7050, AA7050A, AA7150, AA7250, AA7055, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, or AA7099.

Non-limiting exemplary 8xxx series aluminum alloys for use as the metal strip can include AA8005, AA8006, AA8007, AA8008, AA8010, AA8011, AA8011A, AA8111, AA8211, AA8112, AA8014, AA8015, AA8016, AA8017, AA8018, AA8019, AA8021, AA8021A, AA8021B, AA8022, AA8023, AA8024, AA8025, AA8026, AA8030, AA8130, AA8040, AA8050, AA8150, AA8076, AA8076A, AA8176, AA8077, AA8177, AA8079, AA8090, AA8091, or AA8093.

In some embodiments, the metal strip comprises AA3104, AA5006, AA5182, or combinations thereof.

While aluminum alloy products are described throughout the disclosure, the methods and products apply to any metal strip. In some embodiments, the metal strip is aluminum, an aluminum alloy, magnesium, a magnesium-based material, titanium, a titanium-based material, copper, a copper-based material, steel, a steel-based material, bronze, a bronze-based material, brass, a brass-based material, a composite, a sheet used in composites, or any other suitable metal or combination of materials. The product may include monolithic materials, as well as non-monolithic materials such as roll-bonded materials, clad materials, composite materials, or various other materials. In some examples, the metal article is a metal coil, a metal strip, a metal plate, a metal sheet, a metal billet, a metal ingot, or the like.

The metal strip can be prepared from an alloy of any suitable temper. In certain examples, the alloys can be used in F, O, T3, T4, T6, or T8x tempers. The alloys can be produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

Pretreatment Coating

The processes described herein, and the can end stock produced therefrom, comprise applying a pretreatment coating to the metal strip. In particular, the processes of the present disclosure include applying the pretreatment coating on a side (e.g., the first side) of the metal strip and laminating a polymer film thereon. Said another way, the polymer film may be adhered to at least a portion of the pretreatment coating. In some cases, the pretreatment coating is applied to a side of the metal strip that corresponds to an interior-facing side of a can end formed from the metal strip. Thus, the pretreatment coating forms a portion of the product side of the can end stock.

As illustrated in the below examples, the pretreatment coating can provide improved feathering performance. In particular, the adhesion of the polymer film to the metal strip can be controlled (e.g., improved) by the selection of an appropriate pretreatment coating and by controlling process parameters (such as the annealing temperature, described below).

In some embodiments, the pretreatment coating is a pretreatment applied to the metal strip, e.g., a pretreatment suited to the metal strip. In some cases, the pretreatment coating may comprise a polymer or co-polymer, e.g., a poly(vinylphosphonic acid-co-acrylic acid) co-polymer. In some embodiments, commercial examples of suitable pretreatments that can be employed as the pretreatment coating include Addibond 712-CP 30 from Solvay (Brussels, Belgium).

In some embodiments, the pretreatment coating has an average thickness of from 5 nm to 100 nm, e.g., from 5 nm to 95 nm, from 5 nm to 90 nm, from 5 nm to 85 nm, from 5 nm to 80 nm, from 5 nm to 75 nm, from 6 nm to 100 nm, from 6 nm to 95 nm, from 6 nm to 90 nm, from 6 nm to 85 nm, from 6 nm to 80 nm, from 6 nm to 75 nm, from 8 nm to 100 nm, from 8 nm to 95 nm, from 8 nm to 90 nm, from 8 nm to 85 nm, from 8 nm to 80 nm, from 8 nm to 75 nm, from 10 nm to 100 nm, from 10 nm to 95 nm, from 10 nm to 90 nm, from 10 nm to 85 nm, from 10 nm to 80 nm, from 10 nm to 75 nm, from 12 nm to 100 nm, from 12 nm to 95 nm, from 12 nm to 90 nm, from 12 nm to 85 nm, from 12 nm to 80 nm, or from 12 nm to 75 nm.

In terms of lower limits, the pretreatment coating may have an average thickness greater than 5 nm, e.g., greater than 6 nm, greater than 8 nm, greater than 10 nm, or greater than 12 nm. In terms of upper limits, the pretreatment coating may have an average thickness less than 100 nm, e.g., less than 95 nm, less than 90 nm, less than 85 nm, less than 80 nm, or less than 75 nm.

Polymer Film

The processes described herein, and the can end stock produced therefrom, comprise laminating a polymer film to the metal strip. In particular, the processes of the present disclosure include laminating the polymer film on a side (e.g., the first side) of the metal strip that corresponds to an interior-facing side of a can end formed from the metal strip. Thus, the polymer film forms a portion of the product side of the can end stock. As further detailed in the examples below, the use of a polymer film on an interior-facing side of a can end (e.g., as opposed to a lacquer) beneficially improves the quality of the can end product. Furthermore, the polymer films described herein (e.g., produced according to the described process conditions) exhibit reduced feathering. Additionally, lamination of a polymer film on the metal strip is more reproducible and cleaner because impurities are typically rare in polymer films.

The polymer film is not particularly limited and may comprise any polymer suitable for the desired use of the can end stock (e.g., as a beverage can). Suitable polymers for the polymer film include, for example, polyethylene, polypropylene, and polyethylene terephthalate (PET). In some cases, the polymer film laminated to the metal strip is a biaxially oriented polymer, such as a biaxially-oriented polyethylene terephthalate (BoPET) film. Commercial suppliers of polymer films suitable for use herein include, for example, Toray Plastics (Front Royal, VA), Mitsubishi Polyester Film (Greer, SC), and DuPont Performance Polymers (Wilmington, DE).

In some embodiments, the polymer film further comprises a colorant, such as a dye or a pigment. Said another way, the polymer film may be a colored polymer film (e.g., a colored PET film). The colorant used in the colored polymer film is not particularly limited. Suitable colorants include, for example, titanium dioxide (e.g., to produce a white polymer film).

In some embodiments, the polymer film has an average thickness of from 5 μm to 50 μm, e.g., from 5 μm to 48 μm, from 5 μm to 46 μm, from 5 μm to 44 μm, from 5 μm to 42 μm, from 5 μm to 40 μm, from 6 μm to 50 μm, from 6 μm to 48 μm, from 6 μm to 46 μm, from 6 μm to 44 μm, from 6 μm to 42 μm, from 6 μm to 40 μm, from 8 μm to 50 μm, from 8 μm to 48 μm, from 8 μm to 46 μm, from 8 μm to 44 μm, from 8 μm to 42 μm, from 8 μm to 40 μm, from 10 μm to 50 μm, from 10 μm to 48 μm, from 10 μm to 46 μm, from 10 μm to 44 μm, from 10 μm to 42 μm, from 10 μm to 40 μm, from 12 μm to 50 μm, from 12 μm to 48 μm, from 12 μm to 46 μm, from 12 μm to 44 μm, from 12 μm to 42 μm, or from 12 μm to 40 μm.

In terms of lower limits, the polymer film may have an average thickness greater than 5 μm, e.g., greater than 6 μm, greater than 8 μm, greater than 10 μm, or greater than 12 μm. In terms of upper limits, the polymer film may have an average thickness less than 50 μm, e.g., less than 48 μm, less than 46 μm, less than 44 μm, less than 42 μm, or less than 40 μm.

Examples of suitable average thicknesses of the polymer film include 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, and 40 μm, and any thickness there between.

In some embodiments, the process of the present disclosure includes laminating multiple layers of polymer film on the metallic strip. In these embodiments, each layer of polymer film may independently be a polymer film as described above. In some cases, multiple layers of polymer film are laminated on the metallic strip, and one or more of the layers are identical (e.g., in terms of composition and/or thickness). In some cases, multiple layers of polymer film are laminated on the metallic strip, and the layers are not identical (e.g., in terms of composition and/or thickness).

As noted above, conventional can end stock products preferentially include polymer films that have been temperature treated (e.g., a high temperature treatment, such as pretreatment). It was believed that high temperature treatment was necessary to provide certain properties, such as high adhesion and low feathering. Conventionally temperature treated polymer films, however, are highly susceptible to crazing. In particular, crazing is seen close to or on the surface of amorphous polymer films (e.g., PET films) that are laminated on an interior-facing (e.g., product) side of a can end stock. It has been found that temperature treatment (e.g., high temperature treatment) alters the conformation of polymer films. The modified conformation of the polymer films may be more susceptible to crazing. Stress applied to the can end stock (e.g., during a seaming process with the can body stock) exacerbates this crazing. Crazing on the interior-facing side of the can end stock is particularly problematic because the products contained within the can (e.g., a liquid beverage) can further exacerbate the crazing and/or react with the metal strip. This can impact the integrity and quality of both the can and the product by leaching metal from the metal strip.

To address the issue of crazing, in some embodiments of the processes described herein, as well as the can end stock produced therefrom, the polymer film does not comprise a high temperature treated polymer. Said another way, in some embodiments, the conformation of the polymer film is not substantially modified. In some cases, the polymer film has a similar conformation before and after production of the can end stock. In some cases, the polymer film has the same conformation before and after production. In some embodiments, this is accomplished by preventing or limiting the melting of the polymer film during lamination. In some embodiments, this is accomplished by preventing or limiting the exposure of the polymer film to high temperatures, e.g., temperatures greater than 200° C., greater than 210° C., greater than 220° C., greater than 230° C., greater than 240° C., or greater than 250° C. Utilizing a non-temperature treated polymer film, as described herein, advantageously produces a can end stock with low susceptibility to crazing. That is, the can end stock produced according to the present disclosure is crazing-resistant. Beneficially, the can end stock may also exhibit low susceptibility to feathering.

FTIR Test

In some cases, the suitability of a polymer film for the can end stock may be assessed by a Fourier-transform infrared spectroscopy (FTIR) test developed by the present inventors. FTIR is a technique used in various quantitative analyses to obtain an infrared spectrum of absorbance or emission of a solid, liquid, or gas. In the FTIR test of the present disclosure, an FTIR absorbance spectrum of the polymer film is analyzed to determine the suitability of the polymer film for use in the can end stock. In particular, the FTIR test assesses the ratio (A/B) of the absorbance peak intensity at a first wavenumber (A) to the absorbance peak intensity at a second wavenumber (B).

The FTIR absorbance spectrum may be obtained by commercially available spectrometers, including, for example, the model 670 from Varian, Inc. (Palo Alto, CA). In some cases, the FTIR spectrometer may include an attenuated total reflectance (ATR) attachment, such as a diamond ATR. One example of a commercially available ATR attachment is GladiATR from Pike Technologies (Madison, WI). In some embodiments, the FTIR absorbance spectrum is obtained by measuring at one location on the polymer film. In some embodiments, the FTIR absorbance spectrum is obtained by measuring at multiple locations (e.g., at least two, at least three, or at least four locations) on the polymer film and averaging the outputs from the spectra.

The suitability of the polymer film for the can end stock may be determined by evaluating and comparing the relative intensity of two absorbance peaks. That is, the suitability of the polymer film may be determined from the ratio (A/B) of the FTIR absorbance peak intensity at a first wavenumber (A) to the absorbance peak intensity at a second wavenumber (B). In some cases, the suitability of the polymer film (as used herein) refers to the susceptibility of the polymer film to crazing before and/or after annealing.

In some embodiments, the first absorbance peak (A) of the FTIR ratio is a peak at a wavenumber from 1330 $cm^{-1}$ to 1350 $cm^{-1}$. In terms of lower limits, the first absorbance peak (A) may be a peak at a wavenumber greater than 1330 $cm^{-1}$, e.g., greater than 1332 $cm^{-1}$, greater than 1334 $cm^{-1}$, greater than 1336 $cm^{-1}$, or greater than 1338 $cm^{-1}$. In terms of upper limits, the first absorbance peak (A) may be a peak at a wavenumber less than 1350 $cm^{-1}$, e.g., less than 1348 $cm^{-1}$, less than 1346 $cm^{-1}$, less than 1344 $cm^{-1}$, or less than 1342 $cm^{-1}$.

In some embodiments, the first absorbance peak (A) may be at wavenumber 1330 $cm^{-1}$, 1331 $cm^{-1}$, 1332 $cm^{-1}$, 1333 $cm^{-1}$, 1334 $cm^{-1}$, 1335 $cm^{-1}$, 1337 $cm^{-1}$, 1338 $cm^{-1}$, 1339 $cm^{-1}$, 1340 $cm^{-1}$, 1341 $cm^{-1}$, 1342 $cm^{-1}$, 1343 $cm^{-1}$, 1344 $cm^{-1}$, 1345 $cm^{-1}$, 1346 $cm^{-1}$, 1347 $cm^{-1}$, 1348 $cm^{-1}$, 1349 $cm^{-1}$, or 1345 $cm^{-1}$, or at any wavenumber there between.

In some embodiments, the second absorbance peak (B) of the FTIR ratio is a peak at a wavenumber from 1400 $cm^{-1}$ to 1420 $cm^{-1}$. In terms of lower limits, the second absorbance peak (B) may be a peak at a wavenumber greater than 1400 $cm^{-1}$, e.g., greater than 1402 $cm^{-1}$, greater than 1404 $cm^{-1}$, greater than 1406 $cm^{-1}$, or greater than 1408 $cm^{-1}$. In terms of upper limits, the second absorbance peak (B) may be a peak at a wavenumber less than 1420 $cm^{-1}$, e.g., less than 1418 $cm^{-1}$, less than 1416 $cm^{-1}$, less than 1414 $cm^{-1}$, or less than 1412 $cm^{-1}$.

In some embodiments, the second absorbance peak (B) may be at wavenumber 1400 $cm^{-1}$, 1401 $cm^{-1}$, 1402 $cm^{-1}$, 1403 $cm^{-1}$, 1404 $cm^{-1}$, 1405 $cm^{-1}$, 1407 $cm^{-1}$, 1408 $cm^{-1}$, 1409 $cm^{-1}$, 1410 $cm^{-1}$, 1411 $cm^{-1}$, 1412 $cm^{-1}$, 1413 $cm^{-1}$, 1414 $cm^{-1}$, 1415 $cm^{-1}$, 1416 $cm^{-1}$, 1417 $cm^{-1}$, 1418 $cm^{-1}$, 1419 $cm^{-1}$, or 1415 $cm^{-1}$, or at any wavenumber therebetween.

Polymer films that exhibit a high FTIR ratio (A/B) are particularly suitable for can end stock described herein. In particular, utilizing a polymer film having a high FTIR ratio produces a can end stock with low susceptibility to crazing. In some embodiments, the polymer film exhibits an absorbance peak intensity ratio (A/B) greater than 0.4, e.g., greater than 0.5, greater than 0.6, greater than 0.8, greater than 1.0, greater than 1.1, greater than 1.2, greater than 1.3, greater than 1.4, or greater than 1.5. In terms of upper limits, the absorbance peak intensity ratio (A/B) of the polymer film may be less than 2.0, e.g., less than 1.9, less than 1.8, less than 1.7, or less than 1.6.

Lacquer

In some embodiments, the can end stock produced according the present disclosure comprises a layer of lacquer. In some cases, for example, a layer of lacquer may be applied to a surface of the metal strip, e.g., the external-facing surface. In these embodiments, the lacquer forms a protective layer between the metal strip and the contents of the can end stock (e.g., the contents of a beverage can formed from can end stock).

The composition of the lacquer suitable for use in the processes described herein is not particularly limited. In some cases, the lacquer comprises a water-based and/or solvent-based composition, which preferably may be sprayed, poured, or otherwise applied to a surface of the metal strip. In some embodiments, the lacquer applied to a surface of the metal strip comprises an epoxy-based solution. A commercial example of a composition suitable for use as a lacquer for the present disclosure includes packaging coatings from AkzoNobel (Amsterdam, Netherlands).

In some embodiments, the layer of lacquer has an average thickness of from 2 m to 20 μm, e.g., from 2 μm to 18 μm, from 2 μm to 16 μm, from 2 μm to 14 μm, from 2 μm to 12 μm, from 2 μm to 10 μm, from 3 μm to 20 μm, from 3 μm to 18 μm, from 3 μm to 16 μm, from 3 μm to 14 μm, from 3 μm to 12 μm, from 3 μm to 10 μm, from 4 μm to 20 μm, from 4 μm to 18 μm, from 4 μm to 16 μm, from 4 μm to 14 μm, from 4 μm to 12 μm, from 4 μm to 10 μm, from 5 μm to 20 μm, from 5 μm to 18 μm, from 5 μm to 16 μm, from 5 μm to 14 μm, from 5 μm to 12 μm, from 5 μm to 10 μm, from 6 μm to 20 μm, from 6 μm to 18 μm, from 6 μm to 16 μm, from 6 μm to 14 μm, from 6 μm to 12 μm, or from 6 μm to 10 μm.

In terms of lower limits, the layer of lacquer may have an average thickness greater than 2 μm, e.g., greater than 3 μm, greater than 4 μm, greater than 5 μm, or greater than 6 μm. In terms of upper limits, the layer of lacquer may have an average thickness less than 20 μm, e.g., less than 18 μm, less than 16 μm, less than 14 μm, less than 12 μm, or less than 10 m.

Examples of suitable average thicknesses of the layer of lacquer include 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, and 20 μm, and any thickness therebetween.

In some cases, the thickness of the layer of lacquer may be expressed in terms of basis weight. In some embodiments, the layer of lacquer has a basis weight of from 1 g/m$^2$ to 15 g/m$^2$, e.g., from 1 g/m$^2$ to 14 g/m$^2$, from 1 g/m$^2$ to 12 g/m$^2$, from 1 g/m$^2$ to 10 g/m$^2$, from 1 g/m$^2$ to 8 g/m$^2$, from 1 g/m$^2$ to 6 g/m$^2$, from 1.5 g/m$^2$ to 15 g/m$^2$, from 1.5 g/m$^2$ to 14 g/m$^2$, from 1.5 g/m$^2$ to 12 g/m$^2$, from 1.5 g/m$^2$ to 10 g/m$^2$, from 1.5 g/m$^2$ to 8 g/m$^2$, from 1.5 g/m$^2$ to 6 g/m$^2$, from 2 g/m$^2$ to 15 g/m$^2$, from 2 g/m$^2$ to 14 g/m$^2$, from 2 g/m$^2$ to 12 g/m$^2$, from 2 g/m$^2$ to 10 g/m$^2$, from 2 g/m$^2$ to 8 g/m$^2$, from 2 g/m$^2$ to 6 g/m$^2$, from 2.5 g/m$^2$ to 15 g/m$^2$, from 2.5 g/m$^2$ to 14 g/m$^2$, from 2.5 g/m$^2$ to 12 g/m$^2$, from 2.5 g/m$^2$ to 10 g/m$^2$, from 2.5 g/m$^2$ to 8 g/m$^2$, from 2.5 g/m$^2$ to 6 g/m$^2$, from 3 g/m$^2$ to 15 g/m$^2$, from 3 g/m$^2$ to 14 g/m$^2$, from 3 g/m$^2$ to 12 g/m$^2$, from 3 g/m$^2$ to 10 g/m$^2$, from 3 g/m$^2$ to 8 g/m$^2$, or from 3 g/m$^2$ to 6 g/m$^2$.

In terms of lower limits, the layer of lacquer may have a basis weight greater than 1 g/m$^2$, e.g., greater than 1.5 g/m$^2$, greater than 2 g/m$^2$, greater than 2.5 g/m$^2$, or greater than 3 g/m$^2$. In terms of upper limits, the layer of lacquer may have a basis weight less than 15 g/m$^2$, e.g., less than 14 g/m$^2$, less than 12 g/m$^2$, less than 10 g/m$^2$, less than 8 g/m$^2$, or less than 6 g/m$^2$.

Examples of suitable basis weight of the layer of lacquer include 1 g/m$^2$, 1.5 g/m$^2$, 2 g/m$^2$, 2.5 g/m$^2$, 3 g/m$^2$, 3.5 g/m$^2$, 4 g/m$^2$, 4.5 g/m$^2$, 5 g/m$^2$, 5.5 g/m$^2$, 6 g/m$^2$, 6.5 g/m$^2$ 7 g/m$^2$, 7.5 g/m$^2$, 8 g/m$^2$, 9 g/m$^2$, 10 g/m$^2$, 11 g/m$^2$, 12 g/m$^2$, 13 g/m$^2$, 14 g/m$^2$, 15 g/m$^2$, and any thickness therebetween.

In some embodiments, the can end stock produced according the present disclosure comprises an adhesion coating between the metal strip and the layer of lacquer. In particular, an adhesion coating may be applied to the metal strip, and the lacquer may be applied thereon. The adhesion coating beneficially fixes the lacquer to the metal strip. In some embodiments, the adhesion coating is a pretreatment applied to the metal strip, e.g., a pretreatment suited to the metal strip. The adhesion coating between the metal strip and layer of lacquer may be the same as or different from the adhesion coating between the polymer film and the metal strip. Commercial examples of suitable pretreatments that can be employed as the adhesion coating between the metal strip and the lacquer include titanium zirconium (Ti—Zr) based pretreatments or chromium (Cr3) based pretreatments, such as Bonderite from Henkel Adhesive Technologies (Düsseldorf, Germany).

Process and System for Preparing a can End Stock

In some aspects, the present disclosure provides processes for preparing can end stock. The processes described herein advantageously produce crazing-resistant can end stock. In some embodiments, the processes described herein produce a laminated can end stock that also exhibits high performance in other testing parameters, such as in an acetic acid test which can assess the corrosion resistance of the laminate against acidic conditions that can result in delamination. These processes can include applying a pretreatment coating to a metal strip, laminating a polymer film to the metal strip, and annealing the laminated metal strip at an annealing temperature ($T_A$). According to the processes of the present disclosure, annealing the laminated metal strip comprises heating to a temperature $T_A$ that is less than 250° C. Annealing at this temperature prevents the polymer film from becoming amorphous (e.g., by melting) and thereby greatly improves the performance characteristics of the produced can end stock.

In some embodiments, the metal strip is coated on both sides. In embodiments according to the present disclosure, a metal strip can be laminated on one side and lacquered on an opposite side. For example, a metal strip can be laminated on an interior-facing side and lacquered on an exterior-facing side, although other configurations can be used. This hybrid laminated/lacquered metal strip can provide improved functional performance on the interior of the can end stock through use of the polymer film while maintaining high cosmetic and functional performance on the exterior of the can end stock through use of a lacquer.

In some cases, the laminated metal stock is passed directly from a lamination process into an annealing process (e.g., into an annealing oven). In some cases, the laminated metal stock is passed directly from a lamination process into a lacquer application system and then into an annealing process (e.g., into an annealing oven). In some cases, the laminated metal stock is quenched (e.g., air quenched or water quenched) before entering into the lacquer application system.

The processes and systems described herein, and various additional features and examples thereof, are described herein with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram of a system 100 for preparing can end stock according to certain aspects of the present disclosure. A metal strip 102 is passed into a pretreatment coating application system 112 that applies a pretreatment coating to the metal strip 102. The pretreatment coating application system 112 can be any suitable system for applying a pretreatment coating to the metal strip 102.

In some cases, the metal strip 102 may be processed before entering the pretreatment coating application system. In some embodiments, the surface of the metal strip 102 may be degreased (e.g., using an acid solution) to clean the surface. In some embodiments, the metal strip 102 may be preheated before entering the pretreatment coating application system.

The pretreated metal strip 104 passes into a lamination system 114. The metal strip 102, as a pretreated metal strip 104, is passed through a lamination system 114 that applies a polymer film 120 to one side of the metal strip 102. In some cases, polymer film can be applied to both sides of the metal strip 102. The lamination system 114 can be any suitable system for laminating a polymer film 120 to the metal strip 102. In some cases, the lamination system 114 is a hot melt lamination system. A laminated metal strip 106 exits the lamination system 114, combining the metal strip 102 with a polymer film 120.

In some embodiments, the laminated metal strip 106 can pass into an optional lacquer application system 116. Lacquer 124 is applied to the metal strip 102 by the lacquer application system 116. The lacquer application system 116 can be any suitable system for applying lacquer 124 to the metal strip 102. A lacquer application system 116 can include an oven for heating or curing the lacquer 124 onto the metal strip 102. In some cases, the lacquer application system 116 is downstream of (e.g., after) the lamination system 114. In some cases, the lacquer application system 116 is upstream of (e.g., before) the annealing oven 118. In some cases, the lacquer application system 116 is upstream of the lamination system 114 or the pre-heating oven 112. In some cases, the lacquer application system 116 is downstream of both the lamination system 114 and the annealing oven 118. In the embodiment shown in FIG. 1, the lacquer application system 116 is located between the lamination system 114 and the annealing oven 118. A laminated, lacquered metal strip 108 can exit the lacquer application system 116.

When an upstream lacquer application system 116 is used, laminated, lacquered metal strip 108 can pass into an annealing oven 118. In some cases, where no lacquer application system 116 is used between the lamination system 114 and the annealing oven 118, laminated metal strip 106 can pass into the annealing oven.

The annealing oven 118 can be positioned downstream of (e.g., after) the lamination system 114 and optionally the lacquer application system 116. In some cases, the annealing oven 118 is positioned immediately downstream of the lacquer application system 116, such that the lacquered, laminated metal strip 108 exiting the lacquer application system 116 passes into the annealing oven 118 before passing or coming into contact with other machinery or systems.

The annealing oven 118 raises the temperature of the lacquered, laminated metal strip 108 to an annealing temperature ($T_A$). The annealing temperature $T_A$ may be lower than the melting temperature ($T_m$) of the polymer film 120. In some embodiments, the annealing temperature $T_A$ is a temperature from 175° C. to 250° C., e.g., from 175° C. to 245° C., from 175° C. to 240° C., from 175° C. to 235° C., from 175° C. to 230° C., from 175° C. to 225° C., from 180° C. to 250° C., from 180° C. to 245° C., from 180° C. to 240° C., from 180° C. to 235° C., from 180° C. to 230° C., from 180° C. to 225° C., from 185° C. to 250° C., from 185° C. to 245° C., from 185° C. to 240° C., from 185° C. to 235° C., from 185° C. to 230° C., from 185° C. to 225° C., from 190° C. to 250° C., from 190° C. to 245° C., from 190° C. to 240° C., from 190° C. to 235° C., from 190° C. to 230° C., from 190° C. to 225° C., from 195° C. to 250° C., from 195° C. to 245° C., from 195° C. to 240° C., from 195° C. to 235° C., from 195° C. to 230° C., from 195° C. to 225° C., from 200° C. to 250° C., from 200° C. to 245° C., from 200° C. to 240° C., from 200° C. to 235° C., from 200° C. to 230° C., or from 200° C. to 225° C. In terms of lower limits, $T_2$ may be greater than 175° C., e.g., greater than 180° C., greater than 185° C., greater than 190° C., greater than 195° C., or greater than 200° C. In terms of upper limits, $T_A$ may be less than 250° C., e.g., less than 245° C., less than 240° C., less than 235° C., less than 230° C., or less than 225° C.

The lacquered, laminated metal strip 108 spends a duration in the annealing oven 118 of sufficient length to impart the desired properties on the lacquered, laminated metal strip 108, including annealing of the metal strip 102 and desired adhesion of the polymer film 120. The duration within the annealing oven 118 can be based on oven length and the speed of the metal strip. In some cases, the duration can be within the range of approximately 2 seconds to approximately 30 seconds, approximately 9 seconds to approximately 15 seconds, approximately 10 seconds to approximately 14 seconds, or approximately 12 seconds. In some cases, the duration can be adjusted (e.g., by adjusting the metal strip speed) as necessary to compensate for changes in the temperature within the annealing oven 118.

After exiting the annealing oven 118, the can end stock 110 (e.g., annealed, lacquered and laminated metal strip) may optionally be quenched, such as in air or a volume of quenching liquid (e.g., water) or by application of coolant to the can end stock 110. The can end stock 110 can be cooled immediately after exiting the annealing oven 118, through quenching or otherwise.

In some cases, the can end stock 110 produced by system 100 can include a metal strip 102 to which a layer of laminated polymer film 120 has been applied to a first side and to which an optional layer of lacquer 124 has been applied to a second side, as shown in FIGS. 1 and 2.

FIG. 2 is a close-up side view of the can end stock 110 of FIG. 1. The can end stock 110 includes metal strip 102 sandwiched between a laminated polymer film 120 and an optional layer of lacquer 124. Sandwiched between the laminated polymer film 120 and the metal strip 102 and between the optional layer of lacquer 124 and the metal strip 102 is the pretreatment coating 202.

FIGS. 3A-3D are axonometric depictions of can end stock 302 in various stages of production. In some cases, the can end stock 302 is the can end stock as described herein, including laminated polymer film and lacquer.

Figures 3A, 3B, 3C, 3D:
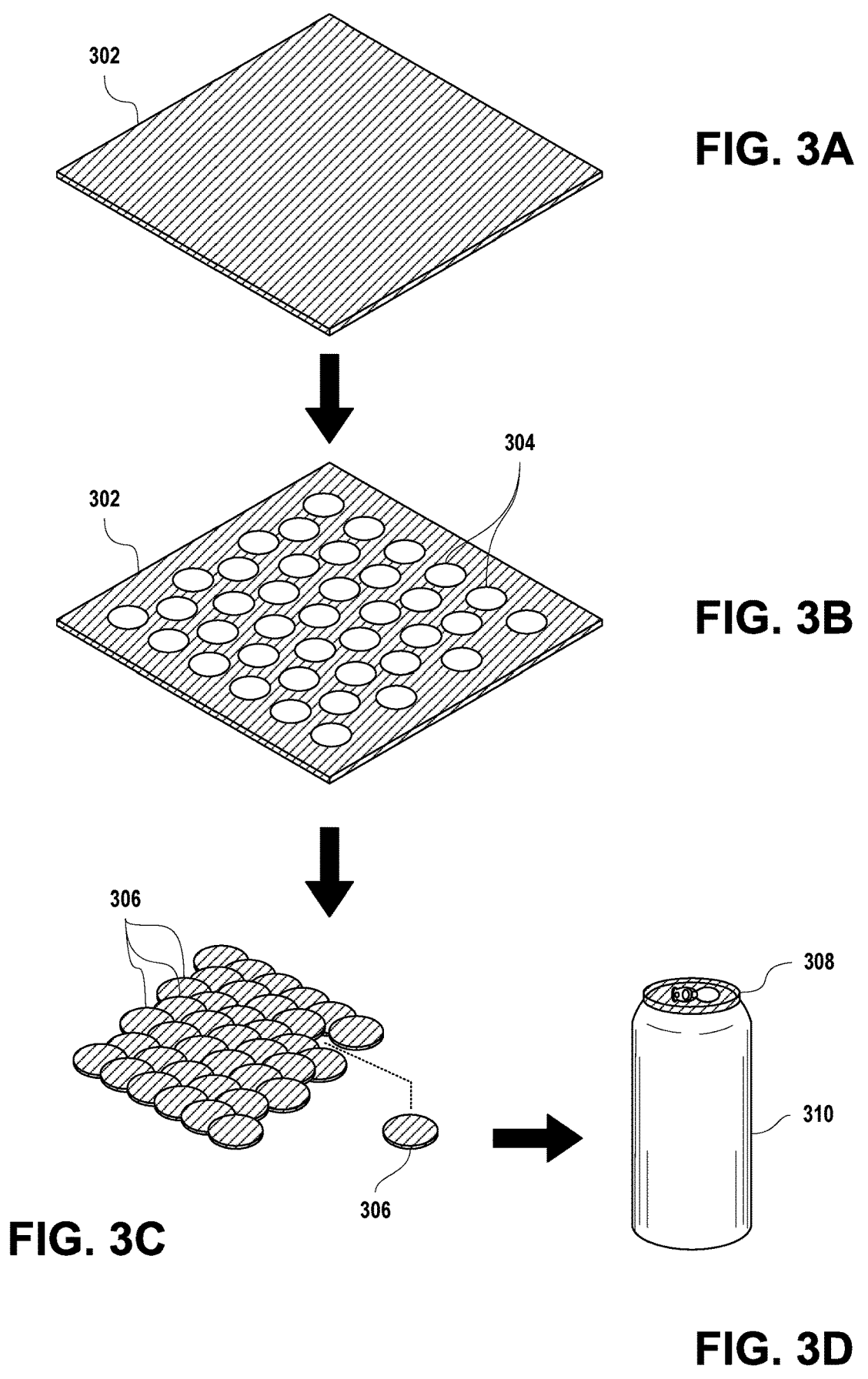

FIG. 3A is a sheet of can end stock 302 according to certain aspects of the present disclosure. The sheet of can end stock 302 can be can end stock 110 depicted in FIG. 1, or a similar can end stock. FIG. 3B depicts the sheet of can end stock 302 of FIG. 3A after it is cut. The sheet of can end stock 302 can be die cut, punched, or otherwise cut to produce can end blanks 306 as shown in FIG. 3C. FIG. 3C depicts a set of can end blanks 306 produced from the sheet of can end stock of FIG. 3A. FIG. 3D depicts a beverage can 310 including a can end 308 formed by the can end blank 306 from FIG. 3C to a can body.

The can end 308 includes an exterior-facing side (e.g., visible in FIG. 3D) and an interior-facing side (e.g., facing the interior of the beverage can 310). As described herein, the can end 308 can be formed such that a laminated polymer film is present on the interior-facing side.

A conventional seaming process may be used to form the beverage can of FIG. 3D from the can end blank 306 of FIG. 3C and a can body. In some aspects, the present disclosure provides methods for preparing a beverage can comprising seaming a can end blank, formed from the can end stock described herein, to a can body. The seaming process may include the steps of placing the can end blank over the can body, and applying a seaming chuck to the can end. The method may also include a step of seaming the can end and the can body, optionally with a seaming roll. The seaming roll may form and/or engage a curl in the can end, which may be compressed the peripheral curl against the chuck to form a seal between the can end and the can body.

As noted above, conventional can end stock (e.g., those including a polymer film in an amorphous state) exhibit crazing following a seaming process. The can end stock of the present disclosure, on the contrary, is crazing resistant. In some embodiments, for example, the can end stock exhibits no visible crazing before and/or after a seaming process.

Figure 4:
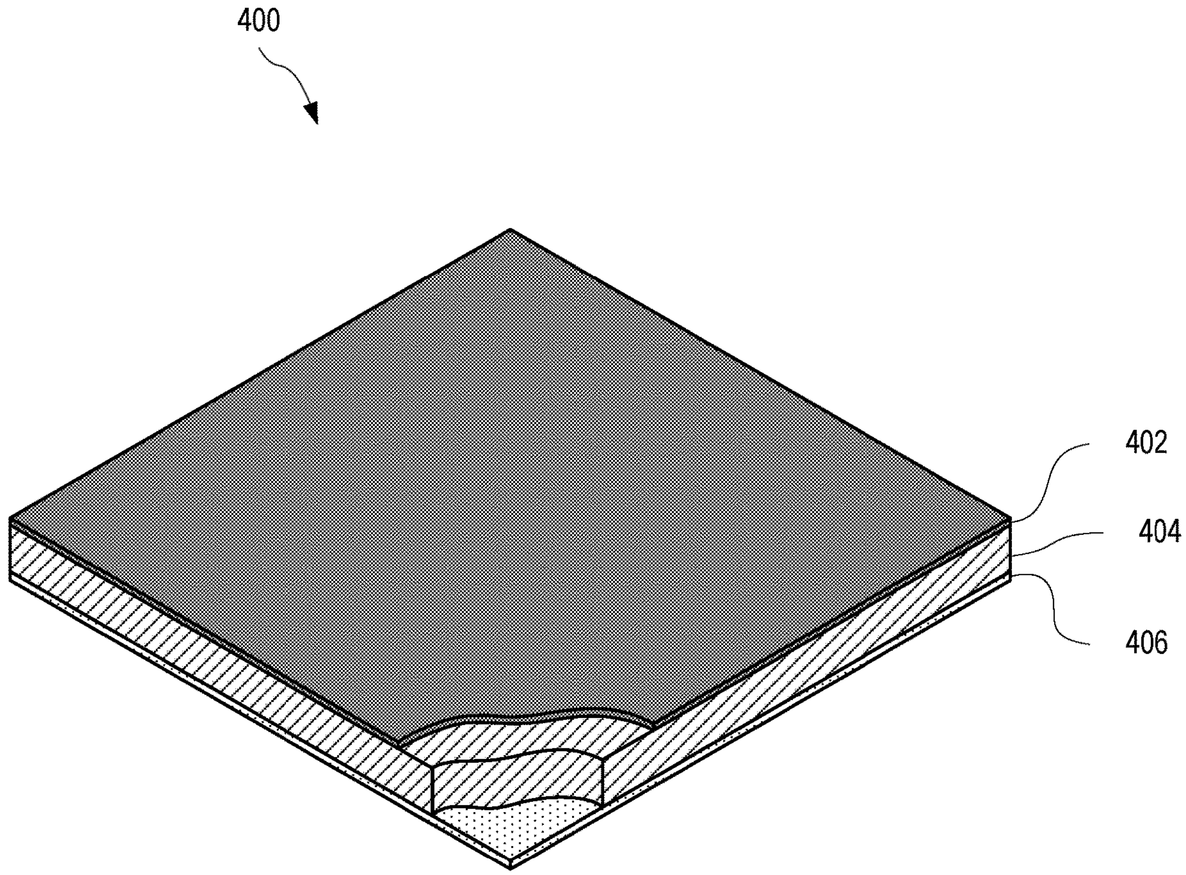
FIG. 4 is an isometric cutaway diagram depicting the multiple layers of a section of can end stock according to certain aspects of the present disclosure.

FIG. 4 is an isometric cutaway diagram depicting the multiple layers of a section of can end stock 400 prepared according to the present disclosure. The can end stock 400 can include a layer of metal 404, such as aluminum (e.g., an aluminum alloy) surrounded by a laminated polymer film 402, and an optional layer of lacquer 406. The can end stock 400 can be the can end stock 110 of FIG. 1.

Figure 5:
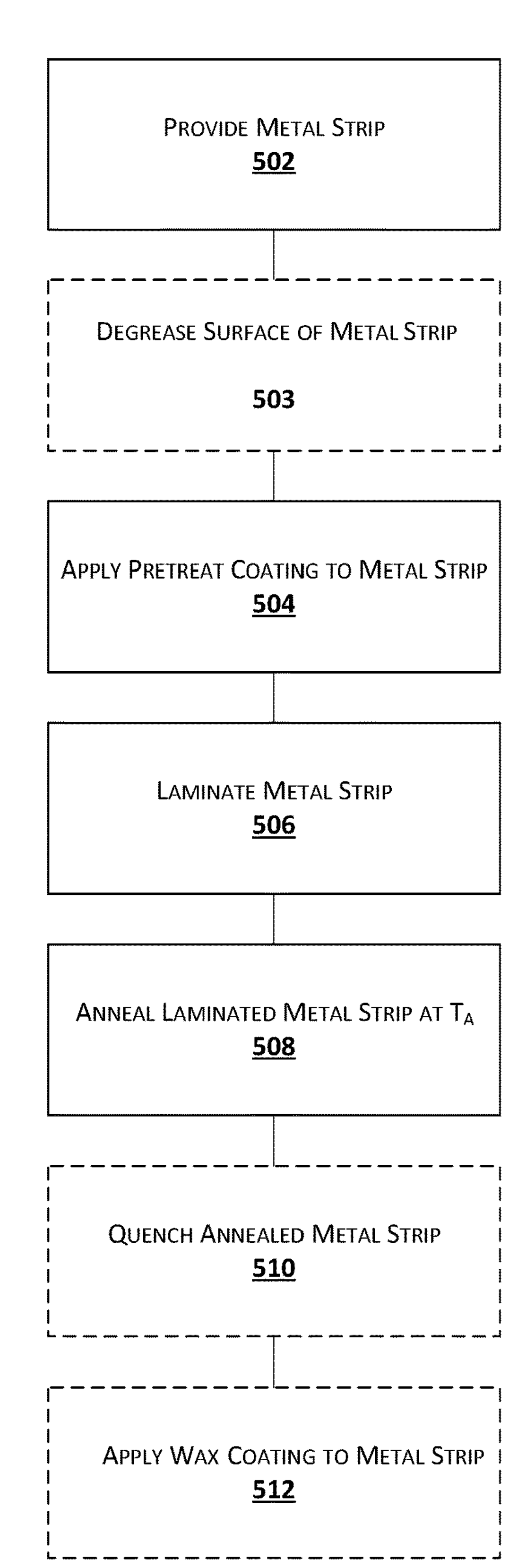
FIG. 5 is a flowchart depicting a process for preparing a can end stock according to certain aspects of the present disclosure.

FIG. 5 is a flowchart depicting a process 500 for preparing can end stock according to embodiments of the present disclosure. At block 502, the metal strip is provided. The metal strip can be an aluminum strip suitable for forming can end stock. At block 503, the surface of the metal strip is optionally degreased (e.g., using an acid solution). At block 504, the pretreatment coating is applied to the metal strip. At block 506, the metal strip is laminated with a polymer film, e.g., a PET film. At block 508, the laminated metal strip is annealed at an annealing temperature $T_A$. At block 510, the annealed metal strip is optionally quenched (e.g., in air). At block 512, a wax coating can be optionally applied to one or both sides of the metal strip.

Figure 6:
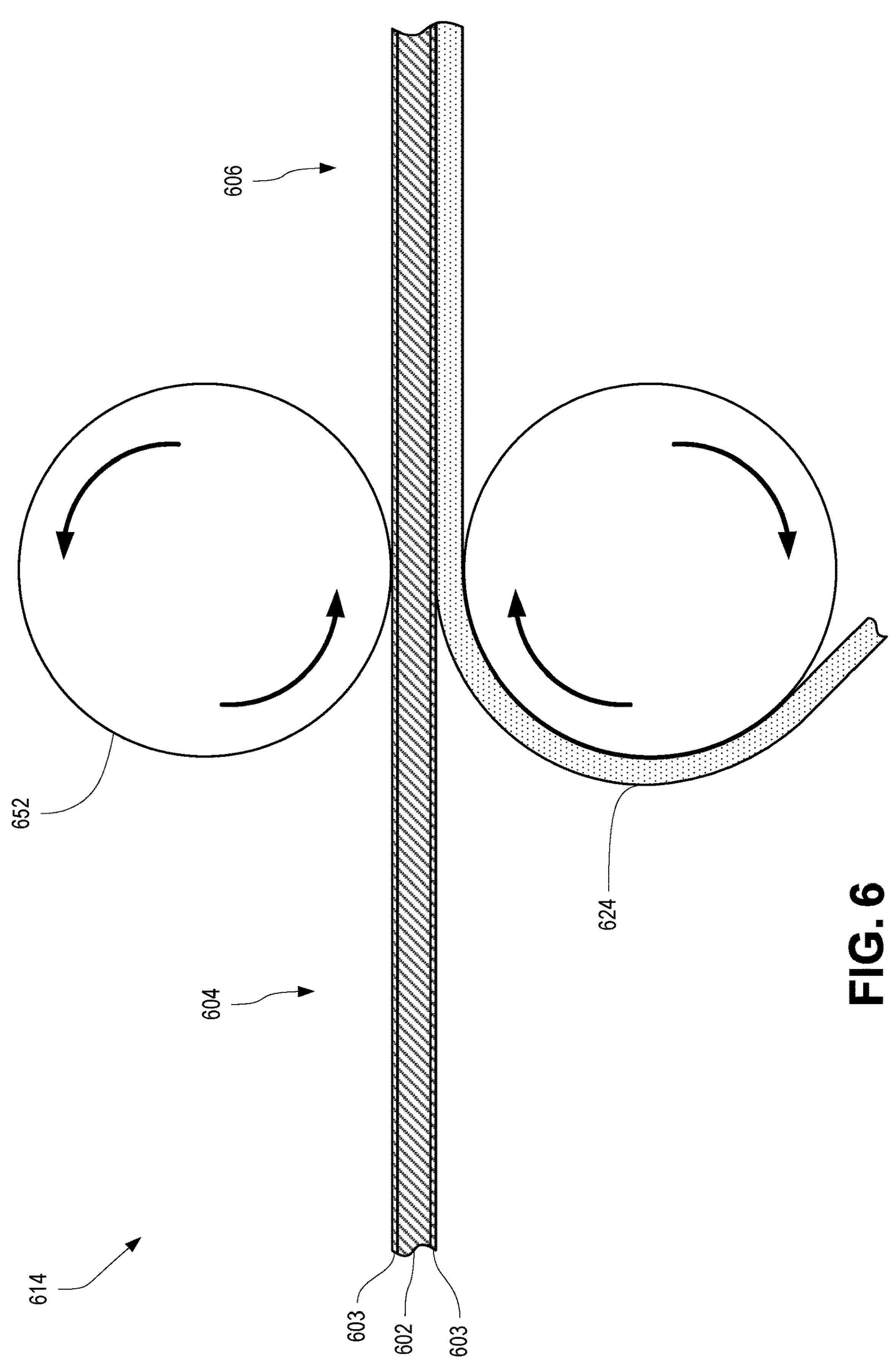
FIG. 6 is a schematic diagram of a lamination system according to certain aspects of the present disclosure.

FIG. 6 is a schematic diagram of a lamination system 614 according to certain aspects of the present disclosure. The lamination system 614 can be the lamination system 114 of FIG. 1, or another lamination system. Certain elements depicted in FIG. 6 are shown at an exaggerated scale for demonstrative purposes only.

The lamination system 614 can include a pair of rollers 652 through which a pretreated metal strip 604 may pass. The pretreated metal strip 604 can include a metal strip 602 that has been pretreated, such as by a pre-heating oven 112 of FIG. 1. In some cases, the pretreated metal strip 604 includes one or more conversion layers 603.

When passing through the rollers 652, a polymer film 624 can be pressed against the pretreated metal strip 604 to produce a laminated metal strip 606. In some cases, a single lamination system 614 can include additional sets of rollers to apply a second polymer film to an opposite side of the pre-heated metal strip 604 from the polymer film 624. In some cases, rollers 652 can additionally apply a second polymer film to an opposite side of the pretreated metal strip 604 from the polymer film 624.

Properties of Can End Stock

As noted above, the can end stock of the present disclosure, e.g., the can end stock produced according to the described processes, advantageously exhibits a number of improved properties.

In some embodiments, the can end stock of the present disclosure exhibits low susceptibility to crazing. Said another way, the present disclosure described crazing-resistant can end stock. As defined above, crazing refers to the formation and/or propagation of small cracks on or close to the surface of a protective layer (e.g., polymer film) on the metal strip, especially during a process for seaming, e.g., of a can end stock to a can body stock. In some embodiments, the can end stock exhibits no visible crazing. For example, the can end stock may exhibit no visible crazing before and/or after a seaming process.

In some cases, the can end stock of the present disclosure exhibits improved results on a 2% strain test. As used herein, a 2% strain test can include assessing the susceptibility of the can end stock to crazing in response to tensile stress. In particular, the strain test may simulate a seaming process, where crazing is particularly problematic. The test can include stamping a sample of the can end stock (e.g., using an automatic press). The sample may be stamped into any shape suitable for a tensile strength test. The stamped samples are then stressed by applying a 2% strain with 10 $N/mm^2 \cdot s$. Afterwards, the stressed samples are left, e.g., at room temperature, for 24 hours, during which time any crazing becomes visible.

In some cases, the 2% strain test may be carried out on an aged sample to maximize the susceptibility of the sample to crazing. For example, the sample can end stock may be heated in an oven for several days (e.g., two days, three days, or four days) at a temperature 10° C. below the glass transition temperature of the polymer film.

In some cases, crazing may be visible on the can end stock, e.g., to the naked eye. In some cases, crazing may be visible with the help of a light source. For example, light may be shone on the sample from the direction of the camera and in a flat angle to the sample (e.g., parallel to the sample). In some embodiments, the light source may shine visible light on the sample. In some embodiments, the light source may shine UV light on the sample. To facilitate observation using a UV light source, the samples may be coated with a fluorescent marker. For example, the samples may be covered with a fluorescent marker (e.g., FBP-914 from MET-L-CHEK (Santa Monica, CA)) for 10 minutes and rinsed with water. The fluorescence can greatly increase the visibility of crazing under a UV light.

In some embodiments, the can end stock exhibits no visible crazing after the strain test. In some embodiments, the can end stock exhibits no visible crazing under light after the strain test. In some embodiments, the can end stock exhibits no visible crazing under UV light after the strain test.

In some embodiments, the can end stock of the present disclosure exhibits improved adhesion. In some cases, for example, the can end stock of the present disclosure exhibits improved results on a 3% acetic acid test. As used herein, a 3% acetic acid test can include assessing the resistance of a coating against diluted acidic media at approximately 100° C. for 30 minutes. The test can include cutting crosshatched markings into samples and placing the samples into a 3% acetic acid solution at approximately 100° C. for 30 minutes, after which the samples are removed and cooled down. After cooling, an additional set of cross cuts are performed on each sample, and adhesive tape is placed over the pre- and post-acid bath crosshatched regions and removing the tape steadily in 0.5 to 1 second at an angle of approximately 60°. The results of the test (e.g., based on the presence of and intensity of delamination) can be used to determine if the metal strip is acceptable or unacceptable given the desired specifications. The degree of delamination is observed and, to the extent delamination occurs, valued on a scale from 1 (minimal delamination) to 5. As used herein, a sample passes the 3% acetic acid test if the sample demonstrates no or low delamination.

Conventional metal strips (e.g., metal strip having a layer of lacquer applied to an external surface) often score poorly on a 3% acetic acid test. In some cases, the annealed, laminated can end stock disclosed herein obtain more favorable results in the 3% acetic acid tests (e.g., no or low delamination) than a standard, lacquered can end stock. In some embodiments, the can end stock disclosed herein passes the 3% acetic acid test with low delamination. In some cases, the annealed, laminated can end stock disclosed herein passes 3% acetic acid tests without delamination.

In some embodiments, the can end stock of the present disclosure exhibits reduced feathering. In some cases, for example, the can end stock of the present disclosure exhibits improved results on a standard feathering test. As used herein, a standard feathering test can be conducted on a can end and may include immersing a can end in a bath of deionized water at approximately 75° C. for thirty minutes, rinsing the can end in cool deionized water to return the can end to room temperature, and then immediately opening the end tab of the can end. Feathering can be observed and measured on the scored panel or pour hole opening. In some cases, a feathering test can be conducted on a flat sheet of metal, such as a flat sheet of can end stock. In such cases, the feathering test can include immersing the sample in demineralized water at 80° C. for forty minutes, after which the sample is allowed to cool down to room temperature and the sample can be cut and a strip of metal can be separated by pulling the strip in a direction away from the cut. In either feathering test, the amount of feathering can be measured, and the can end stock exhibiting a maximum amount of feathering less than 0.7 mm is said to pass the test.

In some examples, the can end stock described herein passes a standard feathering test. In some embodiments, the can end stock exhibits a maximum amount of feathering of less than 0.7 mm, e.g., less than 0.6, less than 0.5 mm, less than 0.4 mm, less than 0.3 mm, or less than 0.2 mm. This amount of feathering may be located at certain indicative positions along the orifice of the opened can end. The amount of feathering of the film also depends on the cutting, forming and stamping tool design of the product.

EXAMPLES

The following examples will serve to further describe the present invention without, however, constituting any limitation thereof. On the contrary, it is to be clearly understood that resort may be had to the various embodiments, modifications, and equivalents thereof that, after reading the description herein, may suggest themselves to those of ordinary skill in the art without departing from the spirit of the invention.

Example 1: Can End Stock

Several samples of can end stock were prepared according to the disclosed methods. The samples were prepared using 0.208 mm thick AA 5182 aluminum alloy as the metal strip. Each of the samples tested is shown in Table 1. Each sample was pretreated, as indicated in Table 1, and can end stock was prepared by laminating a 12 μm polymer film to a first side (internal) and annealing at an annealing temperature.

To evaluate the performance of the above sample can end stock, various tests were performed. To assess the susceptibility of the can end stock to crazing, several tests were carried out. Each sample was tested according to the FTIR test, described above, with the test for each sample being performed from the middle position of the sheet. The FTIR ratio (A/B) was calculated by comparing the absorbance peak intensity at about 1340 $cm^{-1}$ (A) to the absorbance peak intensity at about 1409 $cm^{-1}$ (B). To observe crazing, the 2% strain test, described above, was carried out. Strain tests of Samples 1-22 were run on aged examples. For Samples 9-24, after the 2% strain test was carried out, the samples were coated in the fluorescent marker FBP-914 from MET-L-CHEK (Santa Monica, CA) for 10 minutes and rinsed with water. A UV light was shone on the samples to better indicate crazing. The results of these tests are shown in Table 2.

TABLE 1

| Sample | Pretreatment | Polymer Film | Annealing Temperature |
|---|---|---|---|
| 1 | Addibond 712-CP 30 | Film A | 0° C. |
| 2 | Addibond 712-CP 30 | Film A | 190° C. |
| 3 | Addibond 712-CP 30 | Film A | 210° C. |
| 4 | Addibond 712-CP 30 | Film A | 220° C. |
| 5 | Addibond 712-CP 30 | Film A | 230° C. |
| 6 | Addibond 712-CP 30 | Film A | 240° C. |
| 7 | Addibond 712-CP 30 | Film A | 250° C. |
| 8 | Addibond 712-CP 30 | Film A | 260° C. |
| 9 | Addibond 712-CP 30 | Film B | 0° C. |
| 10 | Addibond 712-CP 30 | Film B | 190° C. |
| 11 | Addibond 712-CP 30 | Film B | 200° C. |
| 12 | Addibond 712-CP 30 | Film B | 210° C. |
| 13 | Addibond 712-CP 30 | Film B | 220° C. |
| 14 | Addibond 712-CP 30 | Film B | 230° C. |
| 15 | Addibond 712-CP 30 | Film B | 240° C. |
| 16 | Addibond 712-CP 30 | Film B | 250° C. |
| 17 | Addibond 712-CP 30 | Film B | 260° C. |
| 18 | Addibond 712-CP 30 | Film C | 20° C. |
| 19 | Addibond 712-CP 30 | Film C | 190° C. |
| 20 | Addibond 712-CP 30 | Film C | 200° C. |
| 21 | Addibond 712-CP 30 | Film C | 210° C. |
| 22 | Addibond 712-CP 30 | Film C | 220° C. |
| 23 | Addibond 712-CP 30 | Film C | 230° C. |
| 24 | Addibond 712-CP 30 | Film C | 240° C. |

TABLE 2

| Sample | FTIR Test Ratio | Strain Test Aged |
|---|---|---|
| 1 | 1.24 | No crazing |
| 2 | 1.22 | No crazing |
| 3 | 1.15 | No crazing |
| 4 | 1.12 | No crazing |
| 5 | 0.44 | Severe crazing |
| 6 | 0.30 | Severe crazing |
| 7 | 0.31 | Severe crazing |
| 8 | 0.30 | Severe crazing |
| 9 | 1.14 | No crazing |
| 10 | 1.15 | No crazing |
| 11 | 1.12 | No crazing |
| 12 | 0.97 | No crazing |
| 13 | 0.35 | Moderate crazing |
| 14 | 0.29 | Moderate crazing |
| 15 | 0.29 | Moderate crazing |

TABLE 2-continued

| Sample | FTIR Test Ratio | Strain Test Aged |
|---|---|---|
| 16 | 0.28 | Moderate crazing |
| 17 | 0.27 | Moderate crazing |
| 18 | 1.17 | No crazing |
| 19 | 1.14 | No crazing |
| 20 | 1.14 | No crazing |
| 21 | 1.14 | No crazing |
| 22 | 1.09 | Moderate crazing |
| 23 | 0.52 | Severe crazing |
| 24 | 0.32 | Severe crazing |

As the above samples demonstrate, aged can end stock becomes susceptible to crazing as the annealing temperature increased. This demonstrates that a low annealing temperature beneficially imparts crazing resistance.

To further assess susceptibility of the can end stock to aging, several samples (Samples 4, 5, 7, 12, 15, 22, 23, and 24) were selected for additional crazing testing. In this testing, the can end stock was subjected to a seaming process. Ends prepared from the sample can end stock were placed on empty can bodies (AA3104, 0.33 mm) and seamed with a laboratory seamer (Stiller DV10 PS-SD). To seam the can end to the body, the edge of the can end is curled and compressed around a rim of the body. After seaming, the can was stored for 24 hours. Afterward, the can end at the seam was covered in a fluorescence marker for 10 minutes, washed, and illuminated under UV light to observe any crazing. The results of this test are shown in Table 3.

To further assess susceptibility of the can end stock to corrosion, several samples (Samples 4, 12, and 22) were subjected to a pack-test corrosion evaluation. Ends prepared from the sample can end stock were placed on can bodies (AA3104, 0.33 mm) and seamed with a laboratory seamer (Stiller DV10 PS-SD). The cans were filled with different beverages. Afterward, the cans were stored for 6 months upside down, such that the seam between the can end and body was covered by the beverage. The cans were evaluated for corrosion at 3 months and 6 months. No corrosion was found, as reported in Table 3.

TABLE 3

| Sample | Seaming Test | Pack-Test |
|---|---|---|
| 4 | No crazing | No corrosion |
| 5 | Moderate crazing | |
| 7 | Moderate crazing | |
| 12 | No crazing | No corrosion |
| 15 | Moderate crazing | |
| 22 | No crazing | No corrosion |
| 23 | Severe crazing | |
| 24 | Severe crazing | |

The above samples again demonstrate that aged can end stock becomes susceptible to crazing as the annealing temperature increased. This further demonstrates that a low annealing temperature beneficially imparts crazing resistance and is beneficial for downstream commercial processes.

To assess adhesion, each sample was tested according to the 3% acetic acid test, described above, with the test for each sample being performed from the middle position of the sheet. To the extent delamination was observed, it was valued on a scale from 1 (minimal delamination) to 5. To assess feathering, the above-described test was carried out by immersing the sample in demineralized water at 80° C. for forty minutes. Feathering was assessed at a middle position of the sheet, and each sample was assessed twice. The results of these tests are shown in Table 4.

TABLE 4

| | Acetic Acid Test | | | |
|---|---|---|---|---|
| | Cross-Cut | Cross-Cross | Max. Feathering (mm) | |
| Sample | Before | After | First Run | Second Run |
| 1 | Delam. | 5 | 6.0 | 2.7 |
| 2 | No delam. | 1 | 0.6 | 0.6 |
| 3 | No delam. | 1 | 0.3 | 0.4 |
| 4 | No delam. | 1 | 0.4 | 0.4 |
| 5 | No delam. | 1 | 0.4 | 0.3 |
| 6 | No delam. | 1 | 0.4 | 0.3 |
| 7 | No delam. | 1 | 0.3 | 0.2 |
| 8 | No delam. | 1 | 0.3 | 0.4 |
| 9 | Delam. | 5 | 10.3 | 11.7 |
| 10 | No delam. | 1 | 0.3 | 0.4 |
| 11 | No delam. | 1 | 0 | 0 |
| 12 | No delam. | 1 | 0.2 | 0.3 |
| 13 | No delam. | 1 | 0.3 | 0.4 |
| 14 | No delam. | 1 | 0.2 | 0.1 |
| 15 | No delam. | 1 | 0.1 | 0.3 |
| 16 | No delam. | 1 | 0.1 | 0.3 |
| 17 | No delam. | 1 | 0.3 | 0.4 |
| 18 | Delam. | 5 | 1.1 | 1.1 |
| 19 | No delam. | 1 | 0.1 | 0.2 |
| 20 | No delam. | 1 | 1 | 0.2 |
| 21 | No delam. | 1 | 0.1 | 0.2 |
| 22 | No delam. | 1 | 0.2 | 0.1 |
| 23 | No delam. | 1 | 0.1 | 0.1 |
| 24 | No delam. | 1 | 0.2 | 0.1 |

The above samples demonstrated excellent adhesion and low susceptibility to feathering.

ILLUSTRATIONS

As used below, any reference to a series of illustrations is to be understood as a reference to each of those illustrations disjunctively (e.g., "Illustrations 1-4" is to be understood as "Illustrations 1, 2, 3, or 4").

Illustration 1 is a process for preparing a crazing-resistant can end stock, comprising: applying a pretreatment coating to a first side of a metal strip; laminating a polymer film to the first side of the metal strip to form a laminated metal strip, wherein the polymer film is adhered to at least a portion of the pretreatment coating; and annealing the laminated metal strip at an annealing temperature, wherein the annealing temperature is less than 250° C.

Illustration 2 is the process of any preceding or subsequent illustration, wherein the can end stock exhibits no visible crazing.

Illustration 3 is the process of any preceding or subsequent illustration, wherein the first side of the metal strip corresponds to an interior-facing side of a can end formed from the metal strip.

Illustration 4 is the process of any preceding or subsequent illustration, wherein the metal strip is an aluminum strip.

Illustration 5 is the process of any preceding or subsequent illustration, wherein the polymer film comprises a polyethylene terephthalate film.

Illustration 6 is the process of any preceding or subsequent illustration, wherein the pretreatment coating comprises a polymer or co-polymer.

Illustration 7 is the process of any preceding or subsequent illustration, wherein the annealing temperatures is less than 230° C.

Illustration 8 is the process of any preceding or subsequent illustration, wherein the annealing temperature is greater than 150° C.

Illustration 9 is a can end stock product prepared according to the process of any preceding or subsequent illustration.

Illustration 10 is the can end stock product of any preceding or subsequent illustration, wherein the first side of the metal strip corresponds to an exterior-facing side of the can end stock product.

Illustration 11 is the can end stock product of any preceding or subsequent illustration, wherein the polymer film has a thickness less than 50 km.

Illustration 12 is a beverage can comprising a body piece and an end cap, wherein the end cap is formed from can end stock prepared according to the process of any preceding or subsequent illustration.

Illustration 13 is a can end stock, comprising: a metal strip; a pretreatment composition; and a polymer film, wherein the can end stock exhibits no visible crazing.

Illustration 14 is the can end stock of any preceding or subsequent illustration, wherein the can end stock exhibits no visible crazing within 24 hours after a strain test, wherein the strain test comprises application of a 2% strain with a 10 $N/mm^2 \cdot s$ force.

Illustration 15 is the can end stock of any preceding or subsequent illustration, wherein the can end stock exhibits no visible crazing under UV light within 24 hours after the strain test, wherein the strain test further comprises coating the samples with a fluorescent marker.

Illustration 16 is the can end stock of any preceding or subsequent illustration, wherein the metal strip is an aluminum strip.

Illustration 17 is the can end stock of any preceding or subsequent illustration, wherein the polymer film comprises a polyethylene terephthalate.

Illustration 18 is the can end stock of any preceding or subsequent illustration, wherein the pretreatment composition is a polymer or co-polymer.

Illustration 19 is the can end stock of any preceding or subsequent illustration, wherein the polymer film exhibits an FTIR absorbance peak intensity ratio (A/B) greater than 0.4, wherein A indicates a first absorbance peak at a wavenumber from 1330 cm 1 to 1350 cm 1 and B indicates a second absorbance peak at a wavenumber from 1400 cm 1 to 1420 cm-1.

Illustration 20 is the can end stock of any preceding or subsequent illustration, wherein the absorbance peak intensity ratio (A/B) is greater than 1.0.

Illustration 21 is a system, comprising: a lamination system for accepting a metal strip and applying a polymer film to a first side of the metal strip; and an annealing furnace positioned downstream of the lamination system for accepting a laminated metal strip and heating the laminated metal strip at an annealing temperature, wherein the annealing temperature is less than 250° C.

Illustration 22 is the system of any preceding or subsequent illustration, wherein the metal strip is an aluminum strip.

Illustration 23 is the system of any preceding or subsequent illustration, further comprising a pretreatment coating application system for applying a pretreatment coating to the metal strip, wherein the lamination system is configured to apply the polymer film to the pretreatment coating.

Illustration 24 is the system of any preceding or subsequent illustration, wherein the lamination system is coupled to a supply of polyethylene terephthalate film.

Illustration 25 is the system of any preceding or subsequent illustration, wherein the annealing temperature is less than 230° C.

Illustration 26 is the system of any preceding or subsequent illustration, wherein the annealing temperature is greater than 150° C.

Illustration 27 is a method for assessing the susceptibility of a can end stock to crazing, the method comprising: stamping a can end stock to produce a test sample; applying a strain to the test sample to produce a stressed sample; and observing the stressed sample for crazing.

Illustration 28 is the method of any preceding or subsequent illustration, wherein applying a strain comprises applying a 2% strain with a 10 $N/mm^2 \cdot s$ force.

Illustration 29 is the method of any preceding or subsequent illustration, wherein observing the stressed sample comprises shining a light on the stressed sample.

Illustration 30 is the method of any preceding or subsequent illustration, further comprising coating the test sample and/or the stressed sample with a fluorescent marker, and wherein observing the stressed sample comprises shining a UV light on the stressed sample.

We claim:

1. A process for preparing a crazing-resistant can end stock, comprising:

applying a pretreatment coating to a first side of a metal strip, wherein the pretreatment coating comprises a polymer or co-polymer;

laminating a polymer film to the first side of the metal strip to form a laminated metal strip, wherein the polymer film is adhered to at least a portion of the pretreatment coating; and annealing the laminated metal strip at an annealing temperature, wherein the annealing temperature is greater than 185° C. and less than 250° C.

2. The process of claim 1, wherein the can end stock exhibits no visible crazing to the naked eye within 24 hours after a strain test, wherein the strain test comprises application of a 2% strain with a 10 $N/mm^2 \cdot s$ force.

3. The process of claim 1, wherein the first side of the metal strip corresponds to an interior-facing side of a can end formed from the metal strip.

4. The process of claim 1, wherein the metal strip is an aluminum strip.

5. The process of claim 1, wherein the polymer film comprises a polyethylene terephthalate film.

6. The process of claim 1, wherein the annealing temperatures is less than 230° C.

7. A can end stock, using the method of claim 1.

8. The can end stock of claim 7, wherein the can end stock exhibits no visible crazing within 24 hours after a strain test, wherein the strain test comprises application of a 2% strain with a 10 $N/mm^2 \cdot s$ force.

9. The can end stock of claim 7, wherein the can end stock exhibits no visible crazing under UV light within 24 hours after the strain test, wherein the strain test further comprises coating the samples with a fluorescent marker.

10. The can end stock of claim 7, wherein the metal strip is an aluminum strip.

11. The can end stock of claim 7, wherein the polymer film comprises a polyethylene terephthalate.

12. The can end stock of claim 7, wherein the polymer film exhibits an FTIR absorbance peak intensity ratio (A/B) greater than 0.4, wherein A indicates a first absorbance peak at a wavenumber from 1330 cm-1 to 1350 $cm^{-1}$ and B indicates a second absorbance peak at a wavenumber from 1400 cm-1 to 1420 $cm^{-1}$.

13. The can end stock of claim 7, wherein the absorbance peak intensity ratio (A/B) is greater than 1.0.

14. A system using the method of claim 1, comprising:

a lamination system for accepting the metal strip and applying the polymer film to the first side of the metal strip; and an annealing furnace positioned downstream of the lamination system for accepting the laminated metal strip and heating the laminated metal strip at the annealing temperature.

15. The system of claim 14, wherein the metal strip is an aluminum strip.

16. The system of claim 14, further comprising a pretreatment coating application system for applying a pretreatment coating to the metal strip, wherein the lamination system is configured to apply the polymer film to the pretreatment coating.

17. The system of claim 14, wherein the lamination system is coupled to a supply of polyethylene terephthalate film.

* * * * *